(12) United States Patent
Biermann et al.

(10) Patent No.: US 6,806,874 B2
(45) Date of Patent: Oct. 19, 2004

(54) METHOD AND APPARATUS FOR PROVIDING SHARP FEATURES ON MULTIRESOLUTION SUBDIVISION SURFACES

(75) Inventors: Henning Biermann, New York, NY (US); Ioana Martin, Pelham Manor, NY (US); Denis Zorin, New York, NY (US); Fausto Bernardini, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 09/911,885

(22) Filed: Jul. 24, 2001

(65) Prior Publication Data

US 2003/0020710 A1 Jan. 30, 2003

(51) Int. Cl.[7] .............................................. G06T 17/00
(52) U.S. Cl. ...................................................... 345/420
(58) Field of Search ........................................ 345/420

(56) References Cited

PUBLICATIONS

A. Khodakovsky et al., :Fine Level Feature Editing for Subdivision Surfaces, 1999, ACM.*
DeRose et al., "Subdivision Surfaces in Character Animation", 1998, Siggraph.*
Biermann et al., "Approximate Boolean Operations on Free–form Solids", Jun. 30, 2001.*
"Efficient, Fair Interpolation Using Catmull–Clark Surfaces," Halstead et al. Computer Graphics Procedings, Annual Conference Series, 1993.
"Behaviour Of Recursive Division Surfaces Near Extraordinary Points," Doo et al., Brunel University, Uxbridge, U.K. IPC Business Press, 1978.

"Recursively Generated B–Spline Surfaces On Arbitrary Topological Meshes," Catmull et al., Computer Graphics Laboratory, New York Institute of Technology, IPC Business Press, 1978.

"Fine Level Feature Editing for Subdivision Surfaces," A. Khodakovsky et al., Proceedings of ACM Solid Modeling, 1999.

"Piecewise Smooth Subdivision Surfaces With Normal Control," H. Biermann et al., Proceedings of SIGGRAPH 00, pp. 113–120, Jul. 2000.

"Maps: Multiresolution Adaptive Parameterizations of Surfaces," A.W.F. Lee et al., Proceedings of SIGGRAPH 98, pp. 95–104, Jul. 1998.

* cited by examiner

*Primary Examiner*—Mark Zimmerman
*Assistant Examiner*—Linzy McCartney
(74) *Attorney, Agent, or Firm*—Ohlandt, Greeley, Ruggiero & Perle, L.L.P.; Louis J. Percello

(57) ABSTRACT

A method for representing a sharp feature on a surface of a model comprises the steps of defining at least one feature curve on the surface; reparameterizing the surface; and creating the feature on the reparameterized surface so as to be generally coincident with the feature curve, where the feature lies along boundaries between piecewise-smooth patch surfaces where patch surfaces with distinct tangent planes are joined. The surface is reparameterized by moving a control mesh relative to the surface to sample the feature curve with vertices of the control mesh, and creating the feature includes a subdivision step where edges and diagonals are treated as creases in the control mesh, and piecewise-smooth subdivision rules are applied to obtain a sharp feature on the surface. The surface may be defined in a Catmull-Clark multiresolution subdivision surface representation.

9 Claims, 24 Drawing Sheets

$$c^{i+1} = (1-\beta-\gamma)c^i + (\beta+\gamma/2)(p_0^i + p_k^i) + \sum_{j=1}^{k-1}(\beta p_j^i + \gamma q_j^i) \quad \text{FIG. 16A}$$

$$p_j^{i+1} = (\tfrac{3}{4} - \gamma)c^i + \gamma p_j^i + \tfrac{1}{16}(p_{j-1}^i + p_{j+1}^i + q_{j-1}^i + q_j^i) \quad \text{FIG. 16B}$$

$$p_1^{i+1} = (\tfrac{11}{16} - \gamma)c^i + (\gamma + \tfrac{1}{16})p_1^i + \tfrac{1}{16}(p_2^i + 2q_0^i + q_1^i) \quad \text{FIG. 16C}$$

$$p_1^{i+1} = (\tfrac{13}{16} - \gamma)c^i + (\gamma - \tfrac{1}{16})p_1^i + \tfrac{1}{16}(p_2^i + 2q_0^i + q_1^i) \quad \text{FIG. 16D}$$

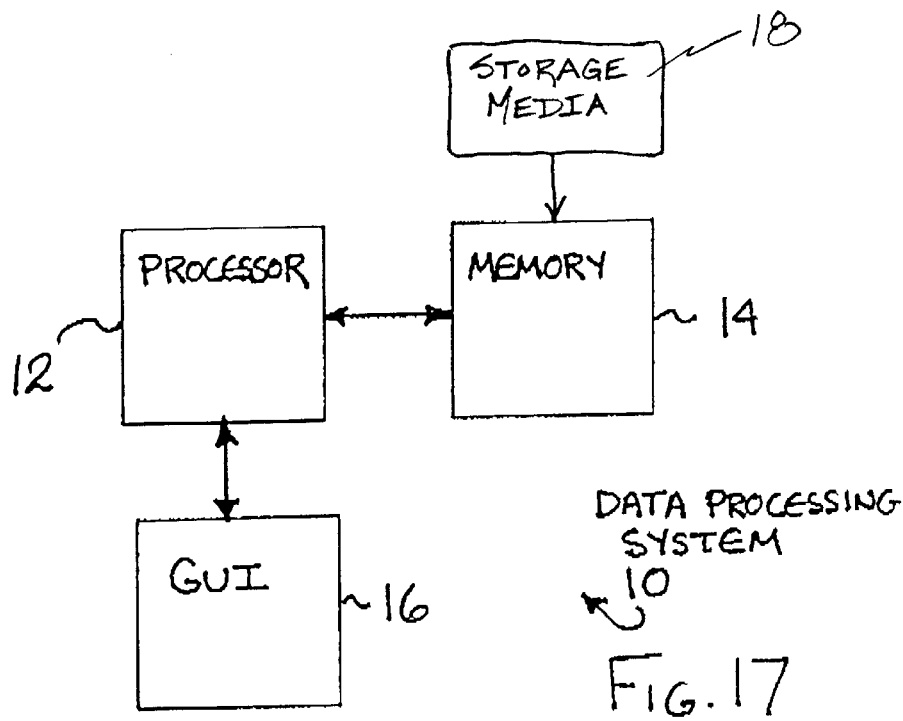

FIG. 17

METHOD AND APPARATUS FOR PROVIDING SHARP FEATURES ON MULTIRESOLUTION SUBDIVISION SURFACES

TECHNICAL FIELD

These teachings relate generally to computer-implemented methods and apparatus for representing and modeling surfaces, including techniques that use a Catmull-Clark surface representation.

BACKGROUND

Interactive editing is an important element of model creation for a variety of applications, ranging from mechanical design to movie character creation. Modeling typically begins with an existing object on which the user performs a sequence of editing operations that lead to the desired shape. Of particular interest to these teachings are small-scale features such as engravings and embossed details that are encountered on many real-life objects.

Traditionally, geometric modeling has relied on non-uniform rational B-splines (NURBS) for surface design. However, NURBS have well-known limitations, such as an inability to address arbitrary topology, tedious cross-boundary continuity management, and a difficulty in representing different resolution levels. In addition, editing operations such as those considered herein typically require features to be aligned with iso-parameter lines or patch boundaries or other complex manipulations in parameter space.

While techniques such as free-form deformations, wires, and procedural modeling offer alternative ways to edit three-dimensional objects, typically they do not present a unified representation that includes both the original surface and the edits. Thus, in many cases, the resulting representation is not the same as the original, but an extension of it. The main drawback of this approach is that algorithms that have been developed for the original representation are not directly applicable to the result and special cases may have to be considered.

The past few years have seen considerable advances in subdivision theory, and many common NURBS operations have been translated into the subdivision setting. Subdivision theory, parametric evaluation, and applications such as interactive editing, trimming, Boolean operations, and geometry compression have contributed to the increasing popularity of multiresolution subdivision surfaces. To date, they have been used in commercial modelers (e.g., Alias/Wavefront's Maya, Pixar's Renderman, Nichimen's Mirai, and Micropace's Lightwave 3D), and are currently being employed in game engines and hardware implementations.

Subdivision algorithms are attractive because of their conceptual simplicity and efficiency with which they can generate smooth surfaces starting from arbitrary meshes. Multiresolution subdivision surfaces offer additional flexibility by allowing modeling of detail at different resolution levels and ensuring that fine-scale edits blend naturally with coarse shape deformations.

Subdivision surfaces permit an efficient representation of free-form surfaces of arbitrary topology. A subdivision surface is defined over an initial control mesh and a subdivision scheme is used to recursively refine the control mesh by recomputing vertex positions and inserting new vertices according to certain rules (masks). Recursive subdivision produces a hierarchy of meshes that converge to a smooth limit surface.

Most objects of interest to geometric design, however, are only piecewise-smooth, and typically exhibit sharp creases and corners. To model these sharp creases and corners using subdivision, special rules are needed to avoid the smoothing of the desired sharp details.

Reference in this regard can be made to FIGS. 1A, 1B and 1C, wherein surface editing processes are depicted. In FIG. 1A features are added to an initial surface. It should be apparent that smooth and sharp features are fundamentally different: smooth features (FIG. 1B) add bumps to the surface, while sharp features create tangent plane discontinuities (FIG. 1C). Previous work in this area has focused on defining the special rules required to define these surface features.

Hoppe et al. introduced rules to create sharp features on subdivision surfaces. DeRose et al. extended the approach of Hoppe et al. to achieve creases of controllable sharpness by using subdivision rules parameterized by a sharpness factor. Reference can also be made to the curve interpolation work of Nasri.

In all of these techniques, there is the common requirement that features need to be aligned with the edges of the underlying control mesh. Therefore, the control mesh is designed with a particular feature in mind. However, a designer might want to first model an initial shape and then apply small-scale features in later stages of the design. The currently available modeling techniques do not adequately support this type of a modeling approach, and thus also do not allow features to be placed at arbitrary locations on the surface.

Multiresolution subdivision surfaces are a natural extension of subdivision surfaces that accommodate editing of details at different scales, allowing general shape deformations as well as the creation of minute features. Multiresolution, however, does not solve the problem of sharp features, as these types of features can only be placed along edges at discrete locations in the mesh hierarchy.

Reference can be made to Khodakovsky and Schroder, who describe a method for interactive creation of feature curves at arbitrary locations on a surface. To create a feature along a curve, a perturbation according to a given profile is applied in the neighborhood of the curve, while maintaining smooth boundary conditions. There are no restrictions on the position of the curve with respect to the underlying surface, however, the representation used is no longer a pure multiresolution surface. In order to create a sharp feature with this technique, it is necessary to enforce the feature profile at each level of the multiresolution hierarchy. Both the surface and the feature curve are required to represent the resulting surface. Thus, one cannot directly apply subdivision surface operations (i.e., evaluation).

Trimming is an important design operation, however, it has been traditionally difficult to perform trimming for parametric surfaces. One conventional approach is described by Litke et al., where quasi-interpolation is used to approximate a trimmed surface with a combined subdivision surface.

It should thus be apparent that the teachings of the prior art do not adequately address the problem of defining certain features, such as surface creases at arbitrary surface locations, in an efficient and computationally efficient manner.

SUMMARY

The foregoing and other problems are overcome by methods and apparatus in accordance with embodiments of these teachings.

These teachings address the problems of feature placement and feature creation by providing a set of tools that allow fine-scale editing and trimming operations to be applied at any desired location on a surface. Multiresolution subdivision surfaces are preferably employed as the model representation, and this representation is preserved after editing, thereby providing flexibility to integrate this technique with other algorithms developed for multiresolution subdivision surfaces.

In the preferred implementation a subdivision scheme for quadrilateral meshes is used. However, these teachings can also be practiced using algorithms developed for triangular meshes.

An aspect of these teachings is an algorithm to produce sharp features at arbitrary locations on a piecewise-smooth multiresolution surface, without requiring that one remesh the control mesh. The sharp features can be created interactively, along curves drawn by the user on the target surface.

A further aspect of these teachings is the provision of an extended set of rules for the Catmull-Clark subdivision scheme that allow the creation of creases and boundaries along diagonals of quadrilateral mesh faces.

Another aspect of these teachings is the provision of a unified solution to offsetting and trimming operations. Using the presently preferred embodiment a sharp crease having a user-defined profile may be applied along a given curve. Alternatively, the portion of the surface delimited by the curve can be trimmed off, creating a hole in the surface.

These teachings extend conventional subdivision schemes for piecewise-smooth surfaces, where control mesh vertices and edges are tagged in order to generate singularities, such as creases, darts, and corners.

The inventive technique removes the conventional constraints related to feature placement by allowing sharp features to be created and edited along any user-defined set of curves on the mesh. These teachings view subdivision surfaces as parametric surfaces defined over the coarsest-level mesh, and compute the image of a given curve in the parametric domain. The technique then reparameterizes the surface to align the parameterization with the curve on some level of the multiresolution hierarchy. Subsequently, special rules are applied to generate non-smooth features.

In accordance with these teachings the issue of sharp features is addressed, enabling them to be placed arbitrarily in a multiresolution subdivision setting, thus allowing greater flexibility in combining feature editing with other existing subdivision tools.

A benefit of the use of this method is an ability to perform trimming of surfaces by simply discarding the portion of surface inside of a given curve.

Further with regard to trimming, quasi-interpolation may be combined with these teachings to obtain trimmed multi-resolution surfaces within a specified tolerance.

Disclosed herein is an efficient method for creating sharp features along an arbitrarily positioned set of curves on a Catmull-Clark multiresolution subdivision surface. The surface is viewed as a parametric surface defined over the initial control mesh, and the method recomputes the parameterization to align it with a pre-image of the feature curves in the parameter domain. The result is a surface represented in the same way as the input surface, with the curves passing through mesh edges or face diagonals. This property enables the application of special subdivision rules along the curve to create sharp profiles.

A further application of the presently preferred algorithm is trimming, which can be achieved simply by discarding the portion of the mesh situated within the trim curve.

The algorithm takes as input arbitrarily shaped curves, with or without self-intersections, as well as multiple intersecting curves. The number of curves intersecting at a point, however, is preferably limited by the number of connections available between a vertex and its neighbors along edges and diagonals (eight in the regular case). However, multiresolution surface representations that allow for topology changes within the hierarchy may be used to resolve this restriction. Other application areas may combine quasi-interpolation or surface fitting with the trimming approach. Also, it is believed that the special diagonal subdivision rules are useful in a general geometric modeling context.

A method in accordance with these teachings represents a sharp feature on a surface of a model, and includes steps of defining at least one feature curve on the surface; reparameterizing the surface; and creating the feature on the reparameterized surface so as to be generally coincident with the feature curve, where the feature lies along boundaries between piecewise-smooth patch surfaces where patch surfaces with distinct tangent planes are joined. The surface is reparameterized by moving a control mesh relative to the surface to sample the feature curve with vertices of the control mesh, and creating the feature includes a subdivision step where edges and diagonals are treated as creases in the control mesh, and piecewise-smooth subdivision rules are applied to obtain a sharp feature on the surface.

BRIEF DESCRIPTION OF THE DRAWINGS

The above set forth and other features of these teachings are made more apparent in the ensuing Detailed Description of the Preferred Embodiments when read in conjunction with the attached Drawings, wherein:

FIGS. 16A–16D are each an Equation referred to in the description of the presently preferred embodiment of the feature editing algorithm;

FIG. 17 is a block diagram of a data processing system that is suitable for practicing these teachings;

DETAILED DESCRIPTION OF THE PREFERRED EMBODIMENTS

Figure 18:
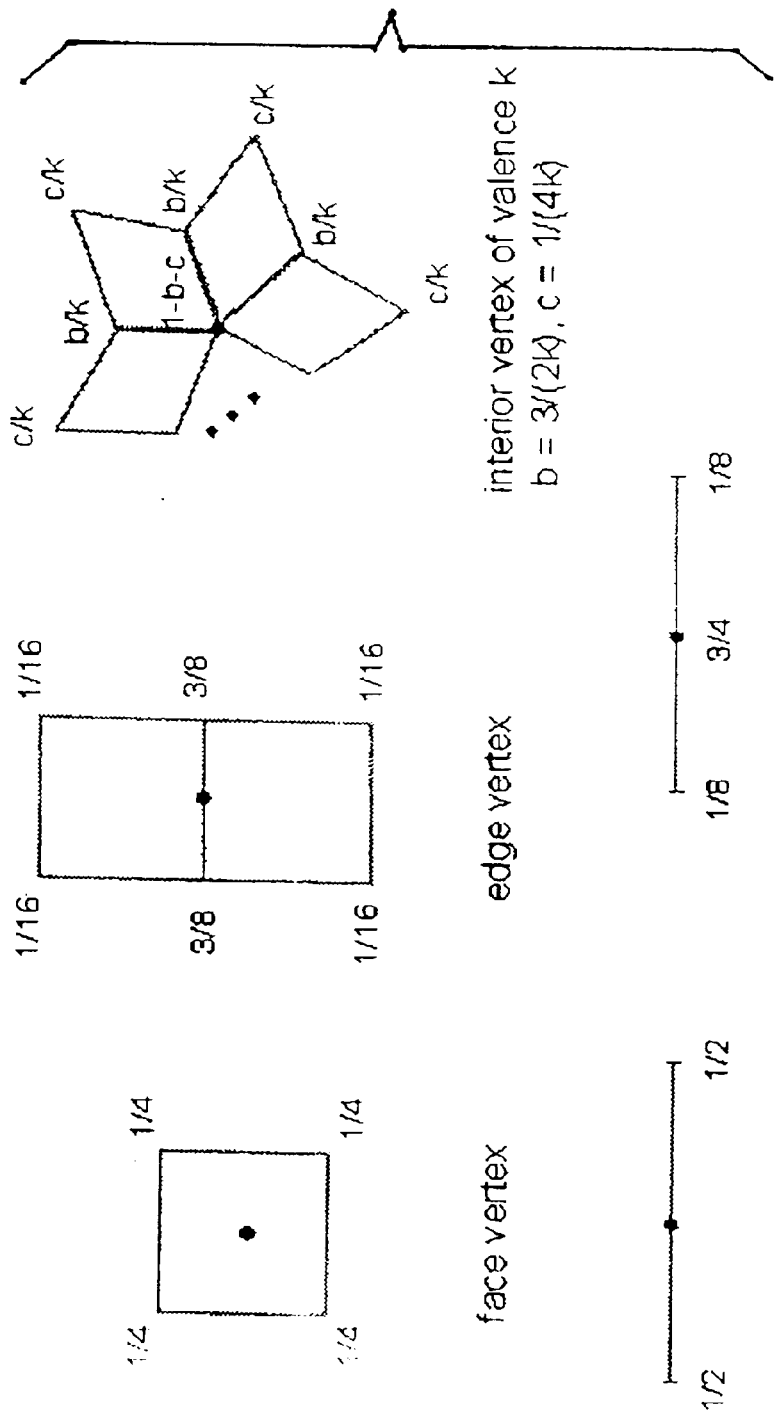
FIG. 18 illustrates masks for use by the conventional Catmull-Clark technique.

By way of introduction, the input to the feature editing algorithm is preferably a Catmull-Clark multiresolution subdivision surface, as defined by E. Catmull and J. Clark, "Recursively generated B-spline surfaces on arbitrary topological meshes", CAD, 10(6):350–355, 1978. Reference may also be had to D. Doo and M. Sabin, "Analysis of the behaviour of recursive subdivision surfaces near extraordinary points", CAD, 10(6):356–360, 1978. The Catmull-Clark scheme extends the tensor product bi-cubic splice subdivision and produces surfaces that are $C^2$ continuous everywhere except at extraordinary vertices where they are $C^1$ continuous. The masks for the Catmull-Clark technique are depicted in FIG. 18 for a face vertex, an edge vertex, and an interior vertex of valance k. The valence of a vertex is defined as the number of faces that are incident to the vertex.

A further input to the algorithm is a set of feature curves on the surface, and a user-selected profile to be applied along these curves. The result is a multiresolution subdivision surface with offset or trim features along the given curves.

The underlying goal is to model sharp features with piecewise-smooth surfaces. Feature curves are viewed as boundaries between smooth surface patches. Sharp features occur along patch boundaries where patches with distinct tangent planes are joined.

Figure 1A:
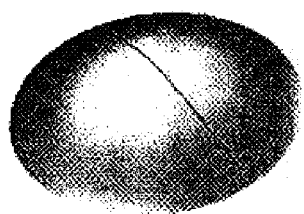
FIGS. 1A–1C, referred to collectively as FIG. 1, are useful in explaining surface editing.
Figure 1B:
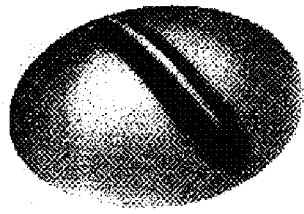
Figure 1C:
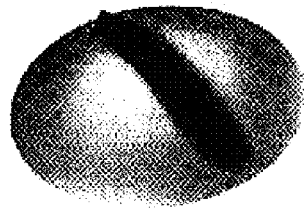
Figures 2A, 2B, 2C, 2D:
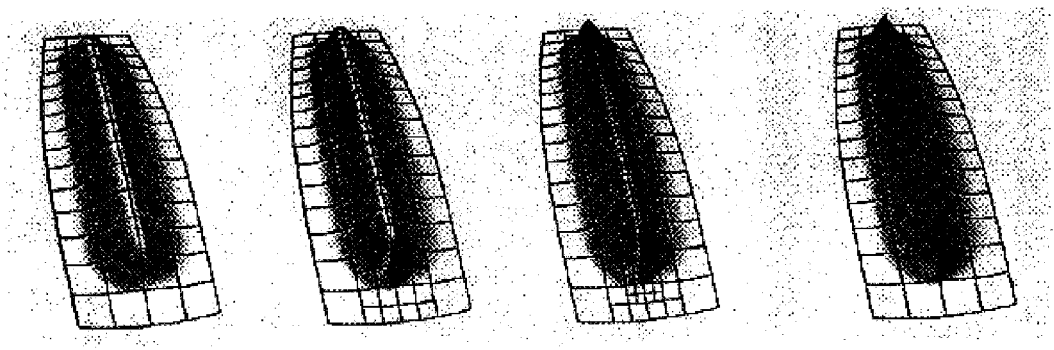
FIGS. 2A–2D, referred to collectively as FIG. 2, are useful in explaining the distinction between adding sharp features to conventional multiresolution Catmull-Clark surfaces (FIGS. 2A–2C), and the piecewise-smooth multiresolution surfaces employed in accordance with these teachings (FIG. 2D)

FIG. 2 is useful in explaining the distinction between adding sharp features to conventional multiresolution Catmull-Clark surfaces (FIGS. 2A–2C), which allow approximating sharp features only by adding additional detail coefficients at finer level control points, and the piece-wise smooth multiresolution surfaces employed in accordance with these teachings (FIG. 2D), where sharp features can be exactly represented without requiring the use of detail coefficients.

The multiresolution surface representation, in accordance with these teachings, enables one to represent sharp features as boundaries or creases by tagging the control mesh edges. The creases generated in this fashion generally do not coincide with the user specified feature curves. Moreover, it may not be possible to create topologically equivalent curves due to the control mesh topology. Therefore, before the feature can be represented it is desirable to change the surface parameterization.

Figure 19:
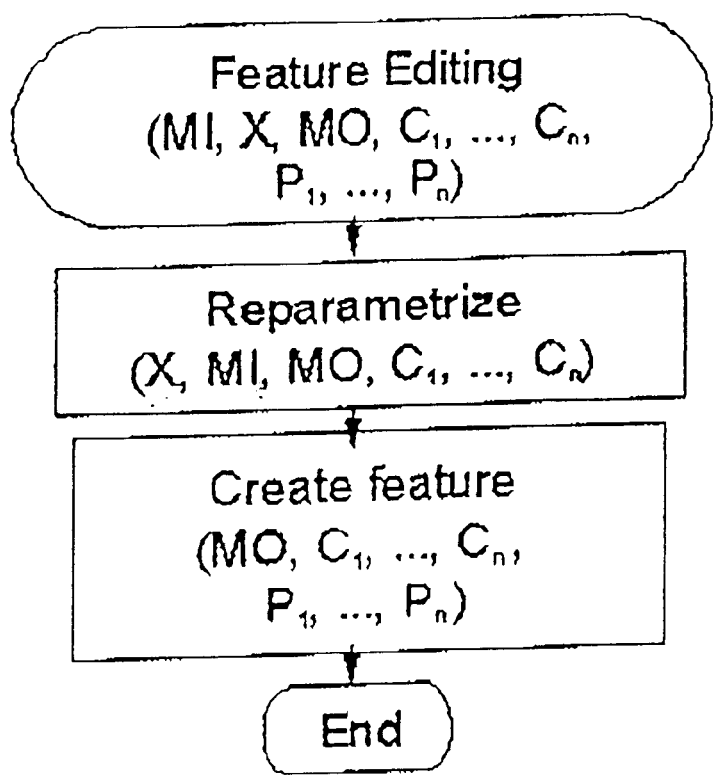
FIG. 19 is a logic flow diagram of the feature-editing algorithm in accordance with these teachings.
Figure 20:
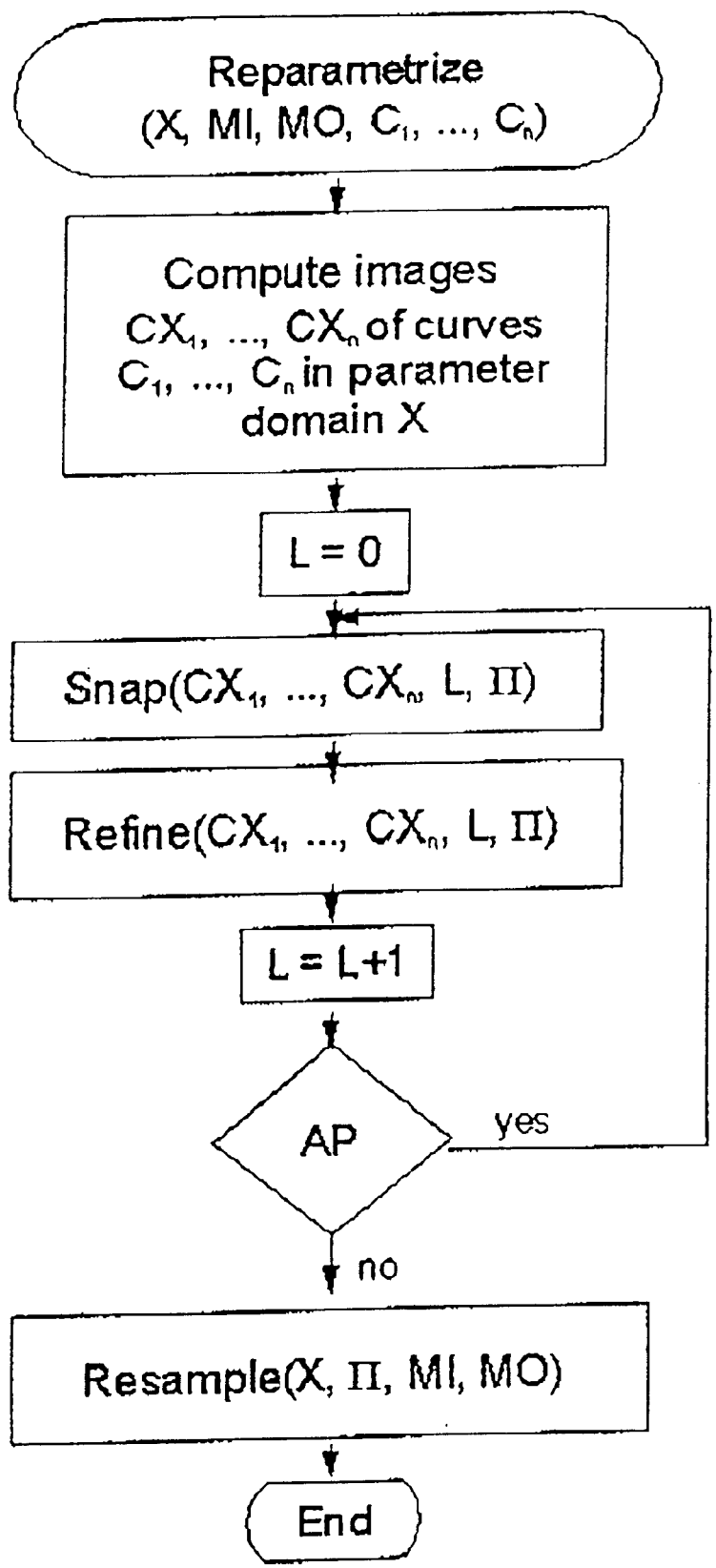
FIG. 20 is a more detailed logic flow diagram of the feature-editing algorithm depicted in FIG. 19.

As is shown in FIGS. 19 and 20, the presently preferred algorithm in accordance with these teachings proceeds in two steps: Reparameterization and Feature Creation. The surface is first reparameterized by sliding the control mesh along the surface in order to sample the feature curve with vertices of the mesh, and one is thus enabled to approximate the feature curve by edges of face diagonals of the control mesh. In the following subdivision step, these edges and diagonals are treated as creases in the control mesh, and piecewise-smooth subdivision rules are applied to obtain a surface with a sharp feature. The surface patches on each side of the feature may be controlled separately. This enables one to shape the feature according to a specified profile curve (see FIG. 14). Moreover, for trimming, one may discard the surface on one side of the feature of interest without changing the surface on the other side of the feature.

The two main steps of the algorithm are now described in further detail. With reference to FIG. 19, we indicate with MI the input multiuresolution mesh parameterized over the domain X, with $C_1, \ldots, C_n$ the n user-specified feature curves, with $P_1, \ldots, P_n$ the n corresponding user-specified feature profiles, and with MO the output multiresolution subdivision surface with feature edits along the input curves.

Reparameterization

Figure 3A:
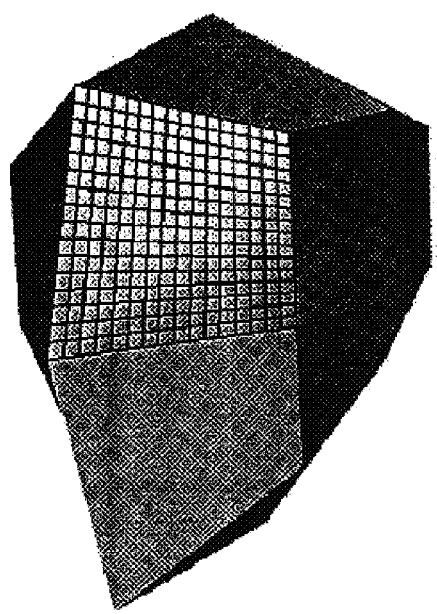
FIGS. 3A and 3B, referred to collectively as FIG. 3, are useful in explaining the concept of a parametric domain and a surface.
Figure 3B:
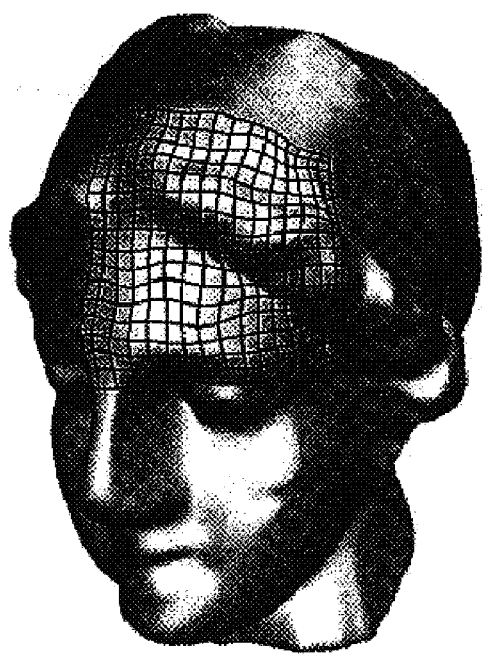
Figure 4A:
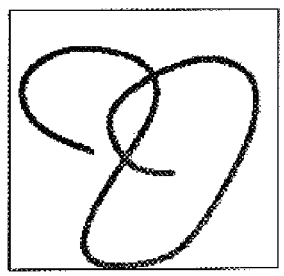
FIGS. 4A–4F, referred to collectively as FIG. 4, illustrate reparameterization matching of a feature curve using subdivision in conjunction with a Snapping operation.
Figure 4B:
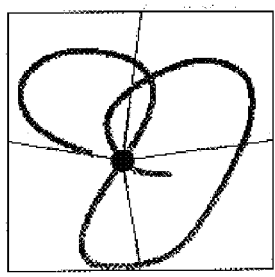
Figure 4C:
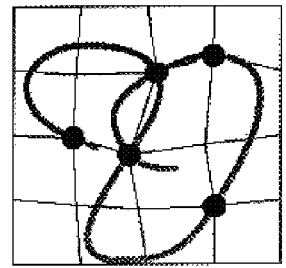
Figure 4D:
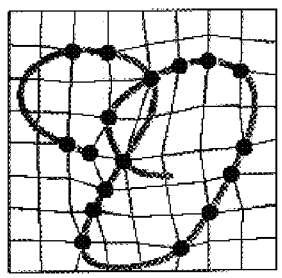
Figure 4E:
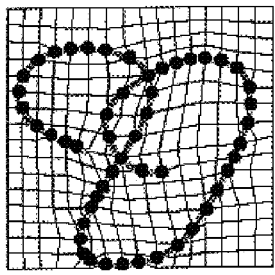
Figure 4F:
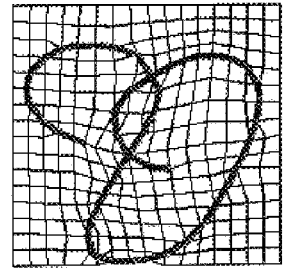

The goal of this step is to align the parameterization of the given surface with a given feature curve. Recall that a multiresolution subdivision surface can be naturally parameterized over the coarsest level control mesh, as is made evident in FIGS. 3A and 3B, which illustrate a parametric domain and surface, wherein subdivision surfaces can be regarded as parametric surfaces. The parametric domain is the coarsest level control mesh (FIG. 3A). The subdivision operator maps vertices of the parametric domain to their image on the surface (FIG. 3B).

Reference can also be had to FIG. 4, which illustrates reparameterization matching a feature curve. A quad of faces is recursively split and vertices are snapped to the curve. After four subdivision steps, the curve is approximated by a sequence of connected mesh vertices. Note that the approximated curve follows edges or passes through quads diagonally.

Some notation is desirable to describe the reparameterization. Let $C_j$ (j=1, ..., n) denote an input curve defined on the domain X of the surface, $C_j:[0,1] \to X$. In general, $C_1$ traverses the domain X at arbitrary positions. It is desired to reparameterize the domain X such that $C_j$, passes through vertices of X. Therefore, one computes a one-to-one mapping $\Pi: X \to X$, which maps vertices of X to curve points: $\Pi(v_i)=C_j(t_i)$, for some vertices $\{v_0, v_1, \ldots\}$ and curve parameters $\{t_0, t_1, \ldots\}$. The mapping $\Pi$ is computed which satisfies the following approximation property (AP):

(AP): the piecewise linear curve has the same $[v_0, v_1, \ldots]$ topology as $C_j$, and either follows along mesh edges or crosses faces diagonally.

Figure 21:
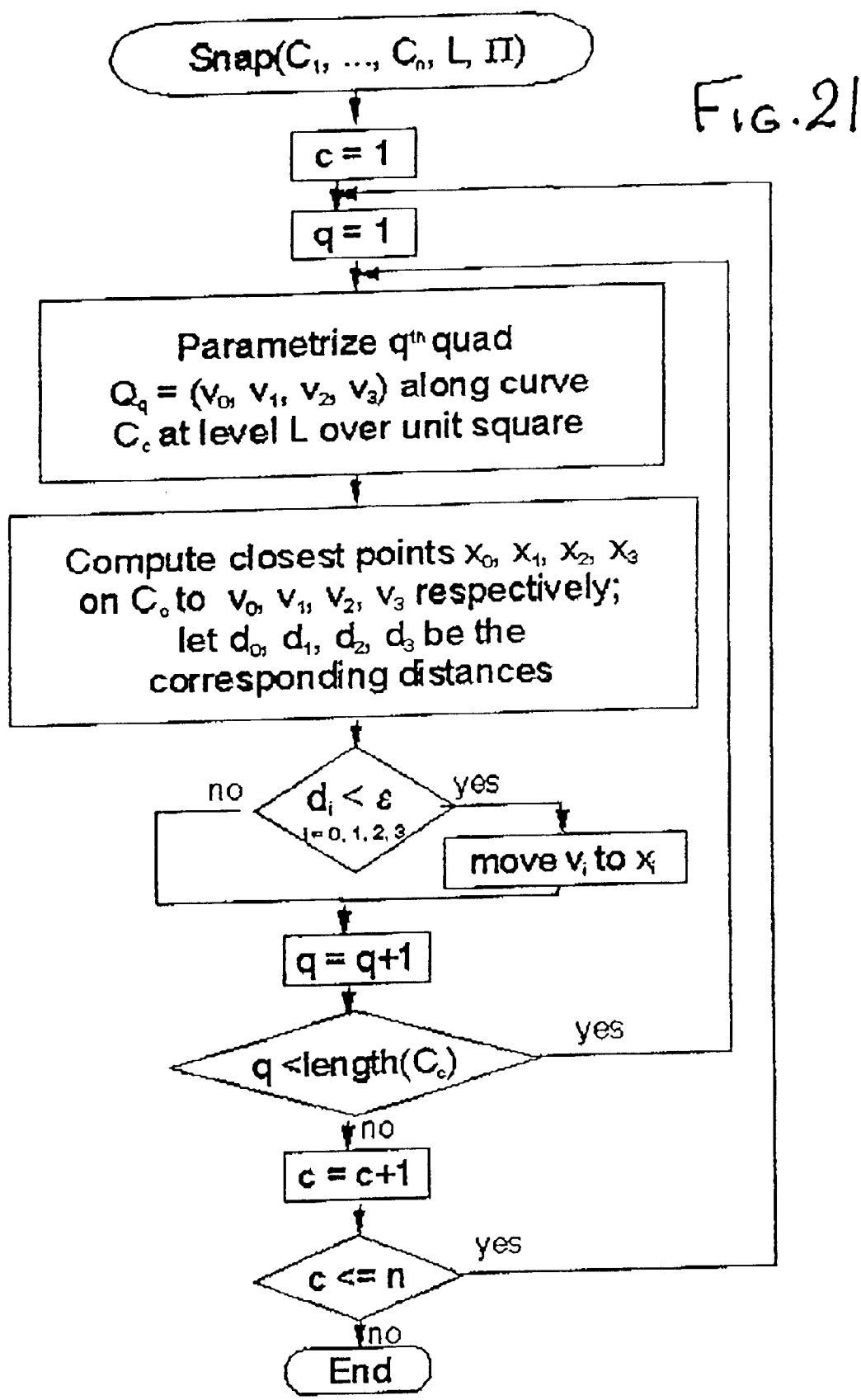
FIG. 21 is a logic flow diagram that depicts the operation of the Snapping procedure as in FIG. 5.

The Reparameterization algorithm proceeds recursively, alternating Snapping and Refinement steps as shown in FIG. 20. As is illustrated in FIG. 21, the Snapping step moves mesh vertices onto the curve if they are sufficiently close. In the Refinement step illustrated in FIG. 22 the method subdivides the parameterization linearly. The Reparameterization algorithm terminates if the sequence of vertices $\{v_0, v_1, \ldots\}$ along $C_j$ satisfies the approximation property (AP). Property (AP) is guaranteed to be satisfied after a finite number of steps for piecewise-linear curves $C_j$.

Figures 5A, 5B:
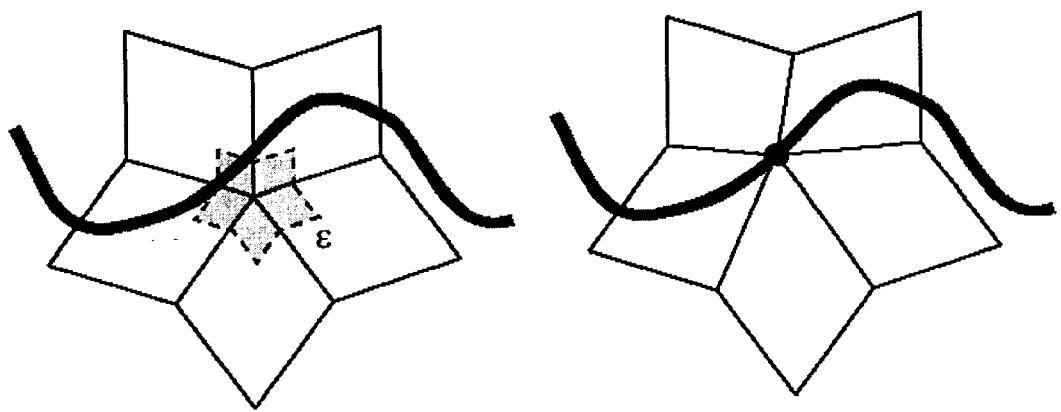
FIGS. 5A and 5B, referred to collectively as FIG. 5, illustrate an example of the Snapping operation wherein vertices are snapped to a closest curve vertex if within a certain predetermined distance $\epsilon$.

FIGS. 5A and 5B also illustrate the Snapping step. Vertices are snapped to closest curve vertex if the distance is less than a certain $\epsilon$. Note that the distances are measured in parameter space, where each face corresponds to the unit square. A single Snapping step reparameterizes the neighborhood of the snapped vertex, as depicted in FIG. 5B.

The Snapping step is defined herein to encompass moving vertices onto the curve $C_j$ if they are sufficiently close to it. First, the algorithm traverses the mesh along the curve on a given subdivision level. For all vertices of the traversed faces the method computes the closest points on the curve. Distances are measured by parameterizing each quad intersected by $C_j$, over the unit square and by computing distances to the curve in this parameter space. This approach presents an advantage over computing geometric distances, in that it does not undersample small quads. Vertices v within a certain distance $\epsilon$ to the curve are snapped to the corresponding closest points $C_j(t)$ on the curve, as is made apparent in FIGS. 4 and 5. The method then assigns $\Pi(v) := C_j(t)$.

The parameter $\epsilon$ controls the distortion of the reparameterization. In general, small values of the parameter $\epsilon$ prevent the vertices from moving too far, but require more Snapping steps. It is preferred that the value of $\epsilon$ is less than 0.5 to ensure that the snapping region around each vertex is disjoint from the snapping regions of its neighbors. It has been found that satisfactory results are obtained with $\epsilon = 0.3$.

Refinement

Figure 22:
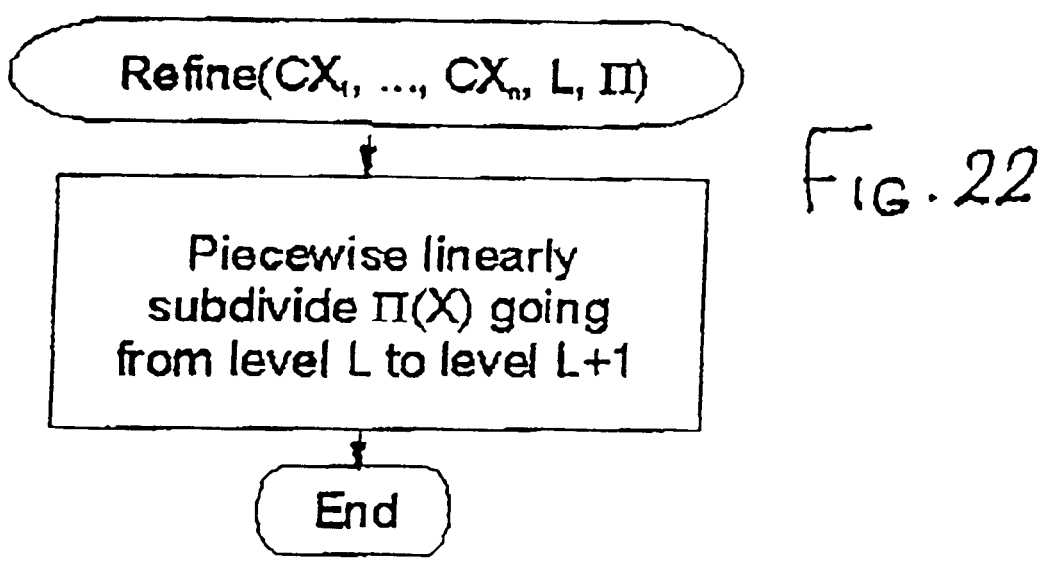
FIG. 22 is a logic flow diagram that depicts the operation of the Refinement procedure.

As is shown in FIG. 22, the parameterization $\Pi$ is piecewise linearly subdivided to increase the resolution and to allow future snapping operations. The subdivision may be done similarly to a procedure given by A. W. F. Lee et al., "Maps: Multiresolution adaptive parameterizations of surfaces", Proceedings of SIGGRAPH 98, pages 95–104, July 1998, ISBN 0-89791-999-8. As in Lee et al., local charts may be used to refine the parameterization $\Pi$, where neighborhoods are mapped to different faces of the coarsest level control mesh.

Constrained Curve Points

In some cases, it may be necessary to align specific points of the domain with mesh vertices. This is the case, for example, when several curves intersect in a corner. Due to the chosen surface representation, a mesh vertex is required at the corner that connects the separate curve branches.

Such constraints are enforced in the Snapping step: i.e., constrained curve points have a higher priority than unconstrained points. For a given vertex, the algorithm first attempts to snap to the unmatched constrained vertices (highest priority). If no snapping is possible to the constrained vertices, then unconstrained points are considered as snap targets.

Resampling

Figure 23:
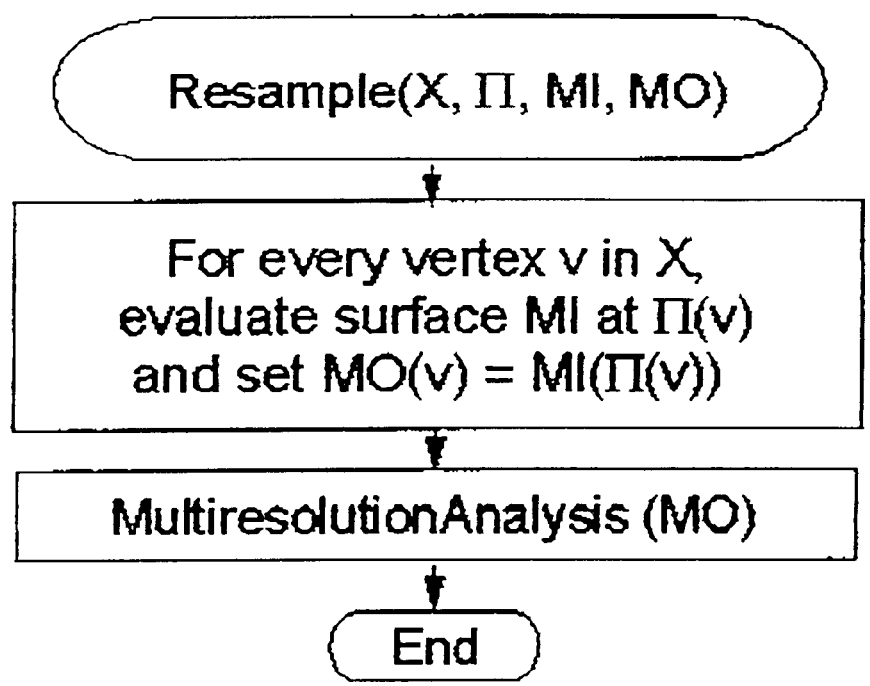
FIG. 23 is a logic flow diagram that depicts the operation of the Resampling procedure.

Referring now to FIG. 23, after reparameterization the surface is resampled at the new parameter positions. Intuitively, this moves the control mesh on the surface and places mesh vertices on the feature curve. With the notation from above, the method iterates over the vertices of the finest level control. For every vertex v of X, the method assigns a new position by evaluation of the input surface at parameter position $X(v)$. Finally, the method applies multiresolution analysis to obtain a multiresolution representation with detail coefficients.

The reparameterization step approximates the feature curves as chains of mesh edges and mesh diagonals. In accordance with an aspect of these teachings, these curves are viewed as crease or boundary curves in the control mesh. In order to create surfaces with sharp features, the method applies crease subdivision rules along the feature curves.

Figure 24:
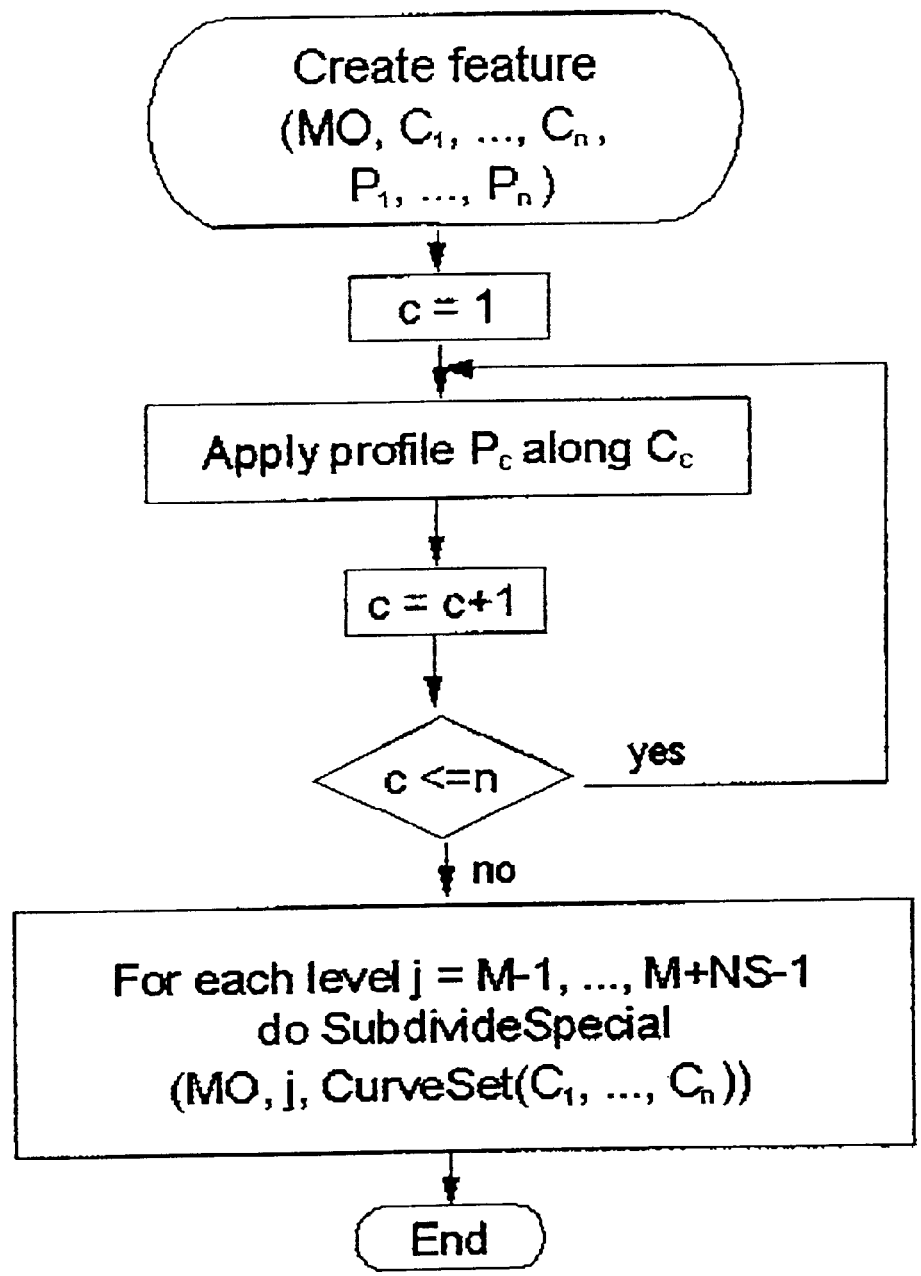
FIG. 24 is a logic flow diagram that depicts the operation of applying a profile, as in FIG. 14.

Referring to FIG. 24, the shape of the feature corresponding to a given curve $C_c$ can be controlled by offsetting mesh vertices in the feature neighborhood according to a user given profile, $P_c$. The profiles shown in FIG. 14 were created by changing the positions of mesh vertices that are close to a feature curve. In the examples in FIG. 14, mesh vertices are displaced normal to the surface and the displacement is determined by their distance to the curve. Note that for closed curves different shape profiles may be used for displacing points in the interior and points on the outside.

Trimming can also be performed by simply interpreting a feature curve as a boundary of the mesh, where the feature curve cuts the control mesh into separate pieces. Each piece thus defined may be subdivided separately and processed further. The resulting surfaces are independent from each other. Moreover, their boundary curves are cubic B-splines.

Figure 6A:
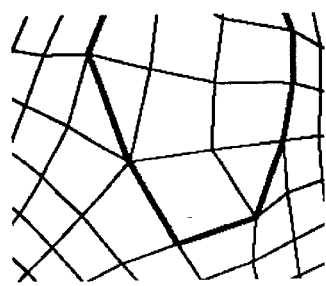
FIGS. 6A–6C, referred to collectively as FIG. 6, show the recursive subdivision of a control mesh with a feature curve.
Figure 6B:
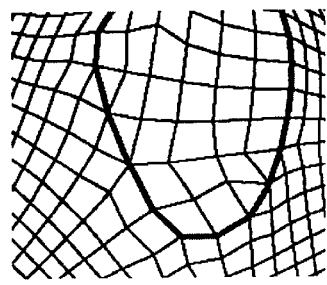
Figure 6C:
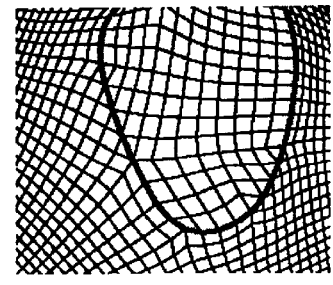

FIGS. 6A–6C are useful in explaining subdivision rules for sharp features, and show the subdivision of a control mesh with a feature curve. The feature curve is a sequence of mesh edges or mesh diagonals acting as a boundary in the mesh. The resulting surface contains two smooth patches joined along a cubic B-spline boundary. The subdivision technique extends piecewise-smooth subdivision with rules for diagonally split faces.

A technique for subdividing control meshes with feature curves, as in FIG. 6, is now described. As in the standard Catmull-Clark subdivision, the method iterates over the mesh on a given level and computes positions of the vertices on the next level by refining the positions of existing vertices (vertex points) and by inserting new vertices on edges (edge points) and in the face centers (face points). Special rules are applied in the vicinity of the curves and standard rules are applied everywhere else. These special rules, in accordance with an aspect of these teachings, extend the piecewise-smooth subdivision of H. Biermann et al., "Piecewise smooth subdivision surfaces with normal control", Proceedings of SIGGRAPH 00, pages 113–120, July 2000, ISBN 0-201-48564-8. The goal is to treat the feature curve as a crease and to refine each side of the mesh independently from each other to create a tangent-plane discontinuity. However, as feature curves may pass through quads diagonally, new rules are introduced that account for such situations. The special rules are referred to as Subdivide Special in FIGS. 24 and 25.

Figure 25:
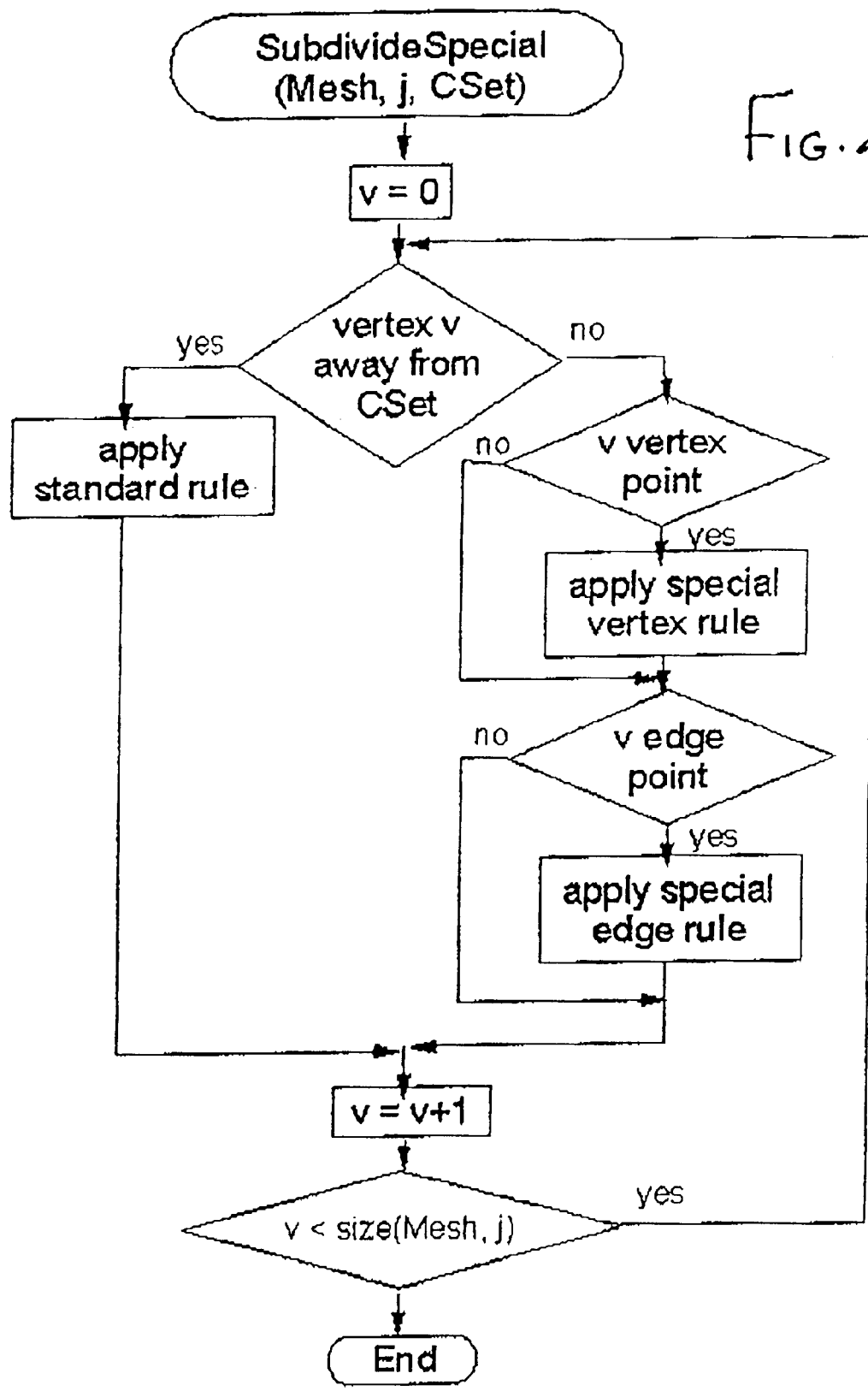
FIG. 25 depicts the operation of the Subdivide Special operation of FIG. 24.

FIG. 25 depicts the operation of the Subdivide Special rules. It is preferred to employ vertex tags to identify the subdivision rules to be applied when traversing the mesh. Initially, all vertices traversed by the feature curves are tagged as crease vertices. Additionally, the method marks the faces that are cut diagonally by the curve, as depicted in FIG. 7.

Figure 7:
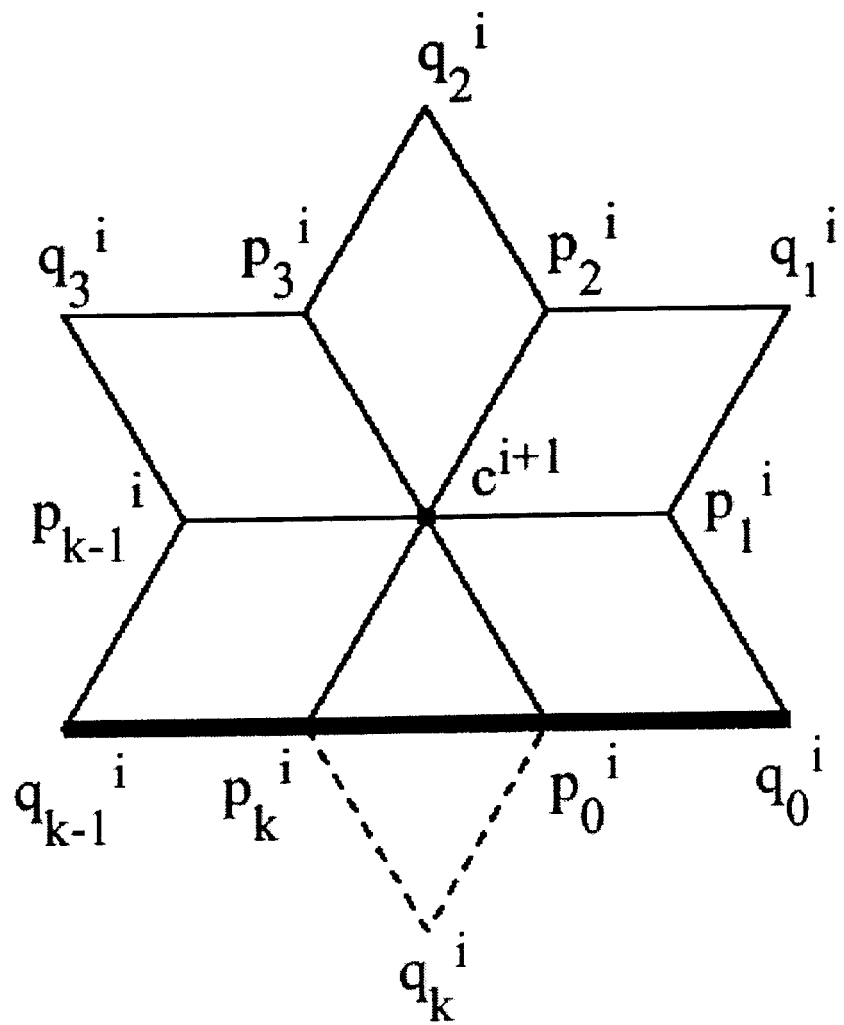
FIG. 7 illustrates the application of a special vertex rule in the neighborhood of a curve that passes through quads diagonally.

FIG. 7 shows the special vertex rule in the neighborhood of a curve that passes through some of the quads diagonally. Point $q_k^i$ is on the opposite side of the curve from $c^i$ and it is not used in the computation of the refined position $c^{i+1}$. The reflection of $c^i$ across the diagonal $(p_k^i, p_0^i)$ is used instead ($\beta=3/(2k)$, $\gamma=1/(2k)$).

A refined control point position corresponding to an untagged vertex is computed as a weighted average of control points in its neighborhood. For a vertex c with valence k (i.e., with k adjacent polygons), its new position $c^{i+1}$ is a linear combination of its previous position weighted by $(1-\beta-\gamma)$ and the positions of the vertices in its 1-ring each weighted by $\beta=3/(2k)$, if situated on an edge incident to c, or by $\gamma=1/(2k)$ otherwise.

A special situation occurs when some of the quads in the 1-ring of c are split by a curve, as in FIG. 7. The previous rule is modified to ignore vertices that are not on the same side, as shown in the Equation of FIG. 16A.

A crease vertex is refined as the average of its old position with weight ¾ and the two adjacent crease vertices with weights equal to ⅛.

Corner vertices (i.e., where two or more creases meet) require additional rules, depending on the neighboring topology, that are similar to those referred to in discussion of creases. Darts (i.e., smooth transitions of a crease into a surface) require no special consideration, as the standard rules are directly applicable at such points.

For faces that are not split diagonally by crease curves, the method inserts a point in the centroid of each face. For faces with a diagonal on the curve, the center point is computed as the average of the two diagonal endpoints on the crease.

On an edge with both endpoints tagged, the method inserts a new vertex as the average of the endpoints. When both endpoints are untagged, the standard edge mask applies.

Figure 8C:
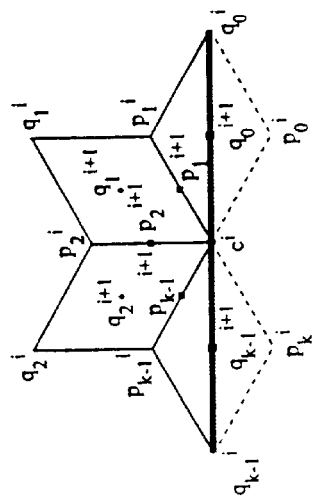
FIGS. 8A–8C, referred to collectively as FIG. 8, illustrate the special rules for edge points on edges with one endpoint on a curve.
Figure 8B:
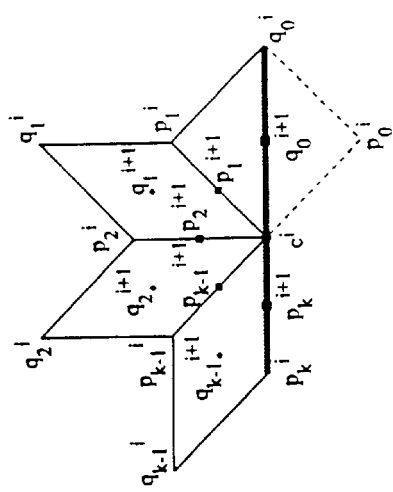
Figure 8A:
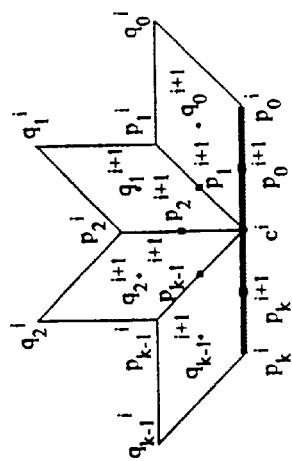

The remaining case is that of an edge with one vertex tagged and the other untagged. A curve passing through a mesh vertex partitions the mesh in the neighborhood of that vertex into two sectors. The rule to be applied to an edge point adjacent to a tagged vertex c is selected depending on the topology of the sectors around the tagged vertex. Three types of sectors are distinguished, as follows:

(1) Consisting of quads only: In this case the curve follows two edges incident to c, and the method applies the case rules described in H. Biermann et al., "Piecewise smooth subdivision surfaces with normal control", Proceedings of SIGGRAPH 00, pages 113–120, July 2000, ISBN 0-201-48564-8, incorporated by reference herein. This case is illustrated in FIG. 8A. The method selects $\theta_k=\pi/k$, where k is the number of polygons adjacent to c in the sector considered, and applies an edge rule which is parameterized by $\gamma=\frac{3}{8}-\frac{1}{4}\cos\theta_k$. The new edgepoints $p_j^{i+1}$ (j=1, ..., k−1) are computed as shown in the Equation of FIG. 16B.

(2) Beginning with a triangle (i.e. a split quad) and ending with a quad or vice versa: In this case the curve passes through the vertex following a mesh edge and a mesh diagonal. This case is illustrated in FIG. 8B. Define $\theta_k$ as above and apply the same edge rule to compute $p_2^{i+1}$, ..., $P_{k-1}^{i+1}$. The edge point $p_1^{i+1}$ between the triangle and the first quad is obtained as shown in the Equation of FIG. 16C.

(3) Beginning and ending with triangles: In this case the curve follows two diagonals incident to c as shown in FIG. 8C. Select $\theta_k=k-1$, and apply the edgerule of the first case to find $p_2^{i-1}$, ..., $P_{k-1}^{i-1}$. The edge points $p_1^{i-1}$ between the first triangles and quads is computed as shown in the Equation of FIG. 16D. The rule for $p_{k-1}^{i+1}$ is symmetric to this. In the special case of k=2, it is preferred to use $p_1^{i+1}=\frac{1}{4}c^i+\frac{1}{2}p_1^i+\frac{1}{8}(q_0^i q_1^i)$ The above-referenced FIG. 8 illustrates special rules for edge points on edges with one endpoint on a curve. FIG. 8A depicts a sector delimited by the curve that consists of quads only: in this case the rules from H. Biermann et al., "Piecewise smooth subdivision surfaces with normal control", Proceedings of SIGGRAPH 00, pages 113–120, July 2000, ISBN 0-201-48564-8, may be applied, $(\theta_k=\pi/k)$. FIG. 8B shows the case where the sector begins with a split quad and ends with a full quad. In this case only $p_0^i$ is on the opposite side of the curve, and the only rule that need be modified is that for $p_1^{i+1}$. The reflection of $c^i$ across the edge $(p_1^i, q_0^i)$ is used $(\theta_k=\pi/k)$. FIG. 8C shows the case where the sector begins and ends with quads that are split by the curve. Points $p_k^i$ and $p_0^i$ are on the opposite side of the curve. The rules that would normally take into account these points to compute $P_1^{i+1}$ and $p_{k-1}^{i+1}$ are modified to use the reflections of the points $p_1^i$ and $p_k^i$ across the curve instead $(\theta_k=\pi/k-1)$. It is preferred that $\gamma=\frac{3}{8}-\frac{1}{4}\cos\theta_k$.

The foregoing subdivision methodology has well-defined limit and tangent properties, and one may efficiently evaluate limit positions of vertices and tangent directions by applying specific masks. Reference in this regard can be made to M. Halstead et al., "Efficient, fair interpolation using Catmull-Clark surfaces", in *Computer Graphics Proceedings*, Annual Conference Series, pages 35–44, ACM Siggraph, 1993. The masks correspond to the left eigenvectors of the subdivision matrix used at that vertex.

A description is now made of some properties of the subdivision rules set forth above, and the rationale for selecting the special rules for crease neighborhoods.

As cubic B-Spline subdivision is used along the features, the resulting curves are B-Splines defined only in terms of control points along the curves. Moreover, the surfaces on either side of the feature do not depend on each other. This is a consequence of the foregoing rules, as no stencil uses vertices from the opposite side of the feature.

The preferred rules have a straight-forward geometric interpretation, as was made evident above in the discussion of FIGS. 8A–8C, but the subdivision theory is used to understand the rules in more detail. The preferred technique follows the conventional Eigen-analysis approach (see, for example, D. Doo and M. Sabin, "Analysis of the behaviour of recursive subdivision surfaces near extraordinary points", CAD, 10(6):356–360, 1978. This aids in understanding the asymptotic behavior of the subdivision operation.

Consider in this regard a neighborhood of a crease vertex c as shown in FIG. 8A, where iterated subdivision contracts the neighborhoods to a single point. It is desirable to ensure a well-shaped limit configuration as well as design rules that preserve a specifically chosen configuration. Technically speaking, rules are designed that have certain desired subdominant eigenvectors. Geometric reasoning is used to reduce the cases of neighborhoods with triangles to a case of neighborhoods without triangles. The reflections mentioned previously are chosen to map the desired eigenvectors to the eigenvectors of the no-triangle case (FIG. 8A). Thus, subdivision rules are preferably defined as follows: (i) apply reflection to complete triangles, (ii) subdivide using no-triangle rules and (iii) discard the unnecessary points. The subdivision scheme defined in this way has the desired eigenvectors.

Figure 9A:
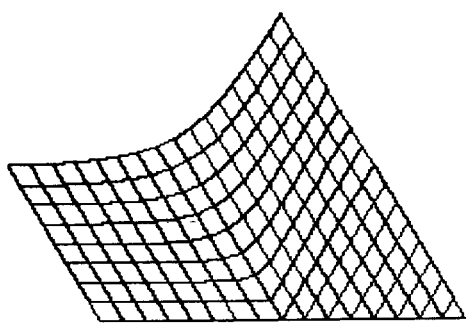
FIGS. 9A–9B, referred to collectively as FIG. 9, illustrate exemplary characteristic maps for crease vertex neighborhoods with a single triangle, and with a valence of 3 (FIG. 9A) and a valence of 6 (FIG. 9B)
Figure 9B:
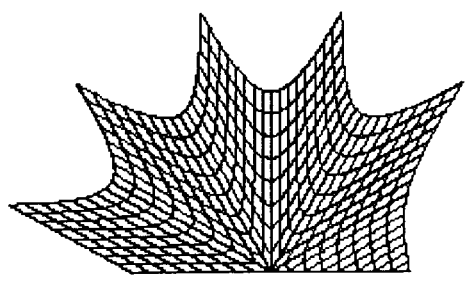

The asymptotic behavior of the subdivision rules are next described, in conjunction with illustrations of the characteristic maps, as in FIGS. 9A and 9B. More specifically, FIGS. 9A and 9B illustrate characteristic maps for crease vertex neighborhoods with a single triangle. The map of FIG. 9A corresponds to a valence 3, and the map of FIG. 9B corresponds to a valence 6, and are used to visualize the limit behavior near the curve vertex. Note should be made that the maps are smooth and one-to-one.

Figure 10A:
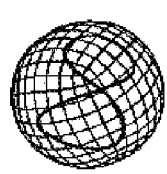
FIGS. 10A–10E, referred to collectively as FIG. 10, depict steps in the execution of a presently preferred algorithm, and which therefore may be viewed as a logic flow diagram.
Figure 10B:
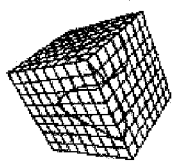
Figure 10C:
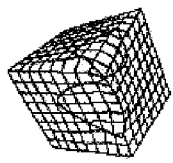
Figure 10D:
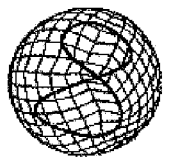
Figure 10E:
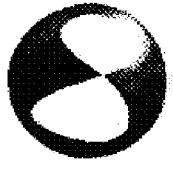

FIGS. 10A–10E illustrate the steps of the algorithm for a trimming sequence. The steps of this algorithm are as follows: FIG. 10A shows the wireframe rendering of a surface with a feature curve; FIG. 10B shows the surface parameterized over a cube; FIG. 10C depicts how the reparameterization operation aligns mesh edges with the feature in the domain; FIG. 10D shows the resampling with respect to new parametric positions; and FIG. 10E illustrates the result of trimming by discarding a piece of the control mesh and subsequent subdivision.

Figure 11A:
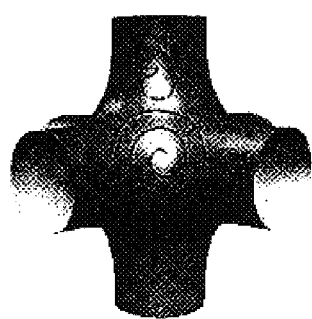
FIGS. 11A–11C, referred to collectively as FIG. 11, show an example of surface editing.
Figure 11B:
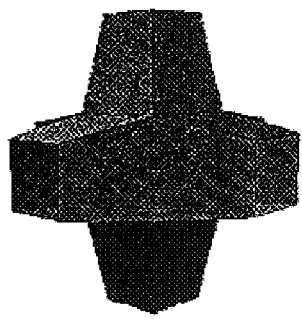
Figure 11C:
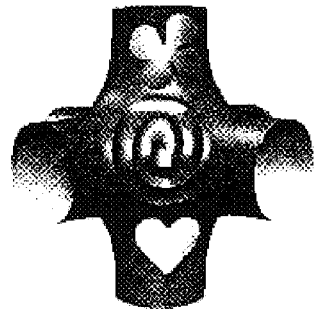
Figure 12A:
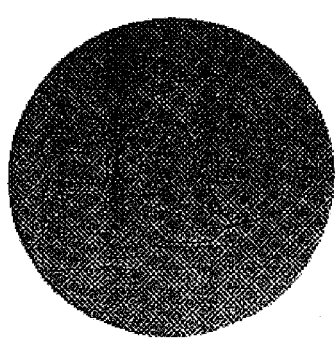
FIGS. 12A–12C, referred to collectively as FIG. 12, show an example of surface shaping.
Figure 12B:
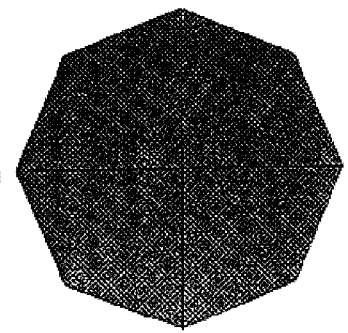
Figure 12C:
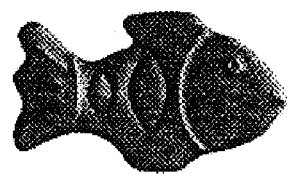

The creation of sharp features and trim regions is illustrated in FIGS. 11A–11C (surface editing) and FIGS. 12A–12C (surface shaping). Note the arbitrary position of the curves with respect to the underlying meshes.

In FIG. 11A a surface is depicted with user-specified feature curves, where closed curves (top and bottom) are trim curves, the open curve in the center indicates an offset feature. FIG. 11B shows an image of the feature curves in the parametric domain, and FIG. 11C depicts the resulting surface with sharp features and trimmed regions. The displacement of the points along the offset curve is a quadratic function of the distance to the curve.

FIGS. 12A and 12B are an example of surface shaping, where a fish pin is cut from a disk using a trim curve along its outer contour, and then shaped with offset curves in the interior.

Figure 14A:
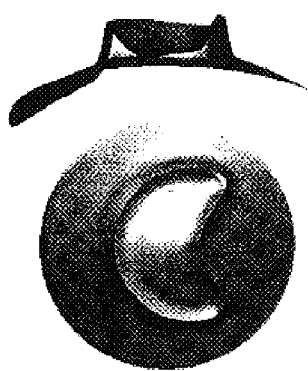
FIGS. 14A–14C, referred to collectively as FIG. 14, each show an example of the use of a different profile that may be used to offset mesh points in the vicinity of a feature curve.
Figure 14B:
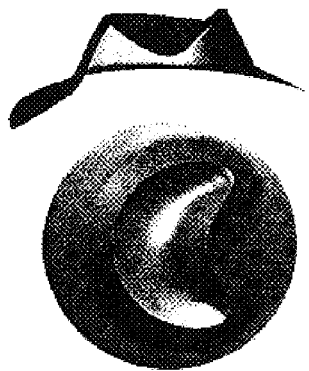
Figure 14C:
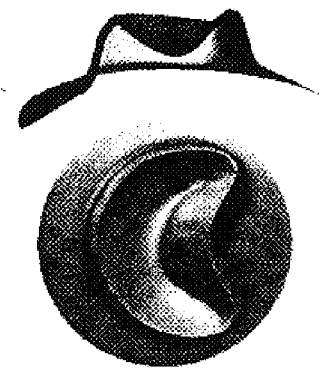
Figures 15A, 15B, 15C, 15D:
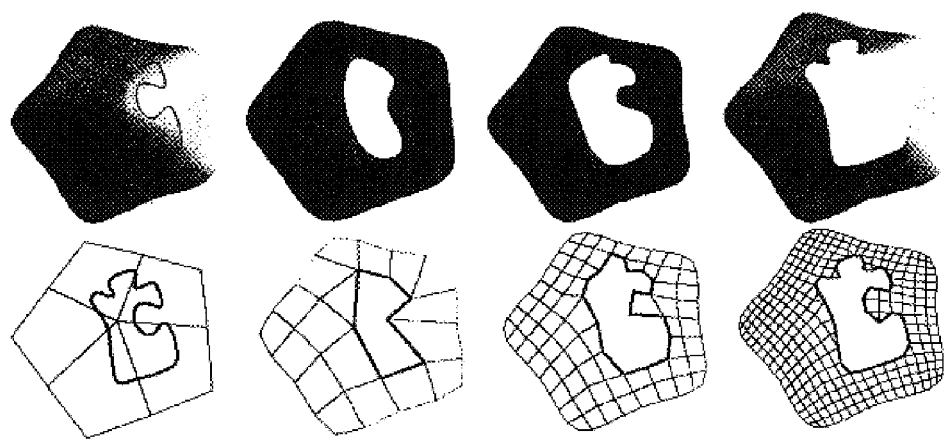
FIGS. 15A–15D, collectively referred to as FIG. 15, each show an example of the use of a trim operation applied on different levels of the mesh hierarchy.

FIGS. 14A–14C illustrate the creation of offset features along a curve according to various user-specified profiles. The profiles are based on distance to the curve. In general, computing distances on surfaces is a difficult problem. In the illustrated examples of FIG. 14 the distance is measured in three-space, which is a reasonable approximation for small distances on surfaces with low curvature. Alternatively, one could use geodesic distances on a control mesh. A reference in this regard is A. Khodakovsky et al., "Fine level feature editing for subdivision surfaces", in Proceedings of ACM Solid Modeling, 1999.

FIG. 14 shows that different profiles may be used to offset the mesh points in the vicinity of a feature curve. In the three cases shown in FIGS. 14A, 14B and 14C, the interior profile is a quadratic function of the distance to the curve. More specifically, in FIG. 14A there is shown a linear exterior profile, in FIG. 14B there is shown a linear exterior profile, where the size of the neighborhood altered is doubled with respect to the image of FIG. 14A, and in FIG. 14C there is shown a Gaussian exterior profile.

Figure 13A:
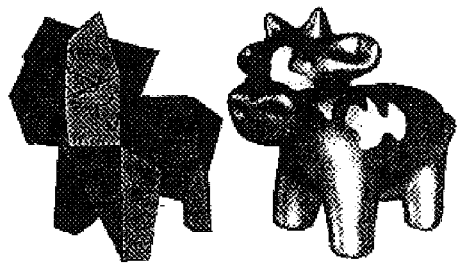
FIGS. 13A and 13B, referred to collectively as FIG. 13, show an example of trim features on a multiresolution surface and offset features with intersections, respectively.
Figure 13B:
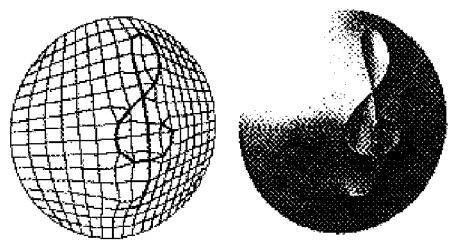

The presently preferred algorithm may also be employed to create features on multiresolution surfaces, as shown in FIG. 13A. Feature curves are shown in FIGS. 10 and 13B. The image pair of FIG. 13A shows the use of trim features on multiresolution surfaces, while the image pair of FIG. 13B shows the use of offset features with intersections. The control mesh of FIG. 13B shows how the reparameterization operation aligns the feature with edges and diagonals. Mesh vertices are placed at curve intersections.

The presently preferred approach to trimming approximates the result of a precise trimming operation. Reference in this regard can be made to FIGS. 15A–15D for illustrating trim operations applied on different levels of the hierarchy. The top row in FIGS. 15A–15D show the distance between the resulting surface and an analytically trimmed surface, while the bottom row shows the corresponding control meshes. The largest error occurs where the surface boundary does not capture the intended trim curve. The surface error obtained by trimming on level 4 (FIG. 15D) is less than 1% (of a base mesh edge).

It is inherent in the presently preferred technique that the resulting surface is different from the input surface (even for a flat feature profile). The differences are due to resampling and the use of piecewise-smooth base functions in the feature neighborhood. Also, the specified feature curves are resampled only at vertices of the control mesh. However, it is possible to control the approximation by resampling surface and feature curves at different levels in the hierarchy. In general, resampling on a finer level reduces the error (as in FIG. 15D), but is computationally more expensive. In the presently preferred implementation the user controls the level on which the resampling takes place. With respect to resampling, it may be desirable to trade-off automatically the degree of surface approximation versus the computational expense.

FIG. 17 is a block diagram of a data processing system 10 that is suitable for practicing these teachings. The data processing system 10 may be embodied in a commercially available workstation, a mainframe computer, a personal computer, or as a computing device that is embedded in another system. The data processing system 10 includes at least one processor 12, a memory 14 and typically a graphical user interface (GUI) 16 for enabling interactivity with a user, as discussed above.

The memory 14 typically includes random access memory (RAM) and some type of mass storage, such as a fixed and/or a removable disk and/or a tape. The memory 14 is assumed to store surface definitions, such as multiresolution subdivision surface definitions, as well as program instructions, typically organized into modules, that are readable by the processor 12 for controlling the processor 12 to implement the presently preferred set of tools that allow the fine-scale editing and trimming operations, as described above and shown in the logic flow diagrams of FIGS. 19 through 25, as well as in the other Figures.

The program executed by the processor 12 produces the sharp features at arbitrary locations on a piecewise-smooth multiresolution surface, without requiring that one remesh the control mesh. The sharp features can be created interactively using the GUI 16, along curves drawn by the user on the target surface. The program executed by the processor 12 also implements, in the preferred but not limiting embodiment of these teachings, the extended set of rules for the Catmull-Clark subdivision technique, i.e., extended rules that allow the creation of creases and boundaries along diagonals of quadrilateral mesh faces.

Although system 10 is described herein as having the data and instructions installed into memory 14, the data and instructions can reside on an external storage media 18 for subsequent loading into memory 14. Storage media 18 can be any conventional storage media, including, but not limited to, a floppy disk, a compact disk, a magnetic tape, a read only memory, or an optical storage media. Storage media 18 could also be a random access memory, or other type of electronic storage, located on a remote storage system and coupled to memory 14.

While these teachings have been particularly shown and described with respect to preferred embodiments thereof, it will be understood by those skilled in the art that changes in form and details may be made therein without departing from the scope and spirit of these teachings.

What is claimed is:

1. A method to represent a sharp feature on a surface of a model represented as a Catmuli-Clark multiresolution subdivision surface, comprising:

defining at least one feature curve on the surface;

reparameterizing the surface; and creating the feature on the reparameterized surface to be generally coincident with the feature curve, wherein the surface is reparameterized by moving a control mesh relative to the surface to sample the feature curve with vertices of the control mesh, wherein C denotes an input feature curve defined on a domain X of the surface, C:[0, 1]→X, where C traverses the domain X at generally arbitrary positions, where the step of reparameterizing operates on the domain X such that C passes through vertices of X, further comprising computing a one-to-one mapping $\Pi: X \rightarrow X$, which maps vertices of X to curve points: $\Pi(v_i)=C(t_i)$, for some vertices $\{v_0, v_1, \ldots\}$ and curve parameters $\{t_0, t_1, \ldots\}$, the mapping $\Pi$ being computed to satisfy an approximation property: a piecewise linear curve has the same $[v_0, v_1, \ldots]$ topology as C, and either follows along mesh edges or crosses faces diagonally, and where the reparameterizing step terminates when the sequence of vertices $\{v_0, v_1, \ldots\}$ along C satisfies the approximation property.

2. A method to represent a sharp feature on a surface of a model represented as a Catmull-Clark multiresolution subdivision surface, comprising:

defining at least one feature curve on the surface;

reparameterizing the surface; and creating the feature on the reparameterized surface to be generally coincident with the feature curve, wherein the surface is reparameterized by moving a control mesh relative to the surface to sample the feature curve with vertices of the control mesh, wherein the surface is reparameterized by alternating Snapping and Refinement steps, where the Snapping step places mesh vertices onto the feature curve if they are within a predetermined distance of the feature curve, and where the Refinement step subdivides the parameterization linearly, and wherein the step of placing mesh vertices operates by snapping vertices to a closest curve vertex if the distance is less than $\epsilon$, where the distance is measured in parameter space where each face corresponds to a unit square.

3. A method as in claim 2, where $\epsilon$ is less than 0.5.

4. A method as in claim 2, wherein the step of placing mesh vertices operates by traversing the control mesh along the feature curve on a given subdivision level, and for all vertices of the traversed faces computing the closest points on the feature curve, where distances are measured by parameterizing each quad intersected by the feature curve over a unit square, and by computing distances to the feature curve in parameter space, where vertices v within a certain distance $\epsilon$ to the feature curve are snapped to the corresponding closest points C(t) on the feature curve.

5. A method to represent a sharp feature on a surface of a model represented as a Catmull-Clark multiresolution subdivision surface, comprising:

defining at least one feature curve on the surface;

reparameterizing the surface; and creating the feature on the reparameterized surface to be generally coincident with the feature curve, wherein the surface is reparameterized by recursively splitting faces of the control mesh and snapping the resulting vertices to the feature curve, and wherein constraints are enforced during the step of snapping such that constrained feature curve points have a higher priority than unconstrained feature curve points.

6. A method as in claim 1, wherein after the reparameterization step terminates further comprising resampling the surface by moving the control mesh on the surface and placing mesh vertices on the feature curve by iterating, for every vertex v of X, assigning a new position by evaluating the surface at parameter position X(v).

7. A method to represent a sharp feature on a surface of a model represented as a Catmull-Clark multiresolution subdivision surface, comprising:

defining at least one feature curve on the surface;

reparameterizing the surface; and creating the feature on the reparameterized surface to be generally coincident with the feature curve, wherein the surface is reparameterized by moving a control mesh relative to the surface to sample the feature curve with vertices of the control mesh, wherein the step of reparameterizing approximates the feature curve as a chain of mesh edges and mesh diagonals, where the feature curve is viewed as a crease or a boundary curve in the control mesh, and where the shape of the surface feature is controlled by offsetting mesh vertices in the feature neighborhood according to a predetermined profile wherein vertices are displaced normal to the surface, where the amount of displacement is determined by the distance of the displaced vertices from the feature curve.

8. A method to represent a sharp feature on a surface of a model represented as a Catmull-Clark multiresolution subdivision surface, comprising:

defining at least one feature curve on the surface;

reparameterizing the surface; and creating the feature on the reparameterized surface to be generally coincident with the feature curve, wherein the surface is reparameterized by moving a control mesh relative to the surface to sample the feature curve with vertices of the control mesh, wherein the feature curve is defined by control mesh vertices or diagonals acting as a boundary in the control mesh such that the resulting surface contains a plurality of smooth patches joined along a cubic B-spline boundary.

9. A method to represent a sharp feature on a surface of a model represented as a Catmull-Clark multiresolution subdivision surface, comprising:

defining at least one feature curve on the surface;

reparameterizing the surface;

creating the feature on the reparameterized surface to be generally coincident with the feature curve; and iterating over the control mesh on a given level and computing positions of the vertices on a next level by refining the positions of existing vertices (vertex points) and by inserting new vertices on edges (edge points) and in face centers (face points), and by applying special rules in the vicinity of the feature curve, wherein the special rules comprise rules to treat the feature curve as a surface crease, to refine each side of the control mesh about the feature curve independently from each other to create a tangent-plane discontinuity, to account for the feature curve passing through a quad diagonally and to account for corner vertices where two or more creases meet.

* * * * *